(12) United States Patent
P et al.

(10) Patent No.: US 11,934,704 B1
(45) Date of Patent: Mar. 19, 2024

(54) CONTROL TABLE SET DETERMINATION IN STORAGE DEVICES

(71) Applicant: Western Digital Technologies, Inc., San Jose, CA (US)

(72) Inventors: Pavithra P, Bangalore (IN); Ashish Kumar, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/954,252

(22) Filed: Sep. 27, 2022

(51) Int. Cl.
*G06F 3/06* (2006.01)

(52) U.S. Cl.
CPC .......... *G06F 3/0659* (2013.01); *G06F 3/0647* (2013.01); *G06F 3/0679* (2013.01); *G06F 3/0604* (2013.01)

(58) Field of Classification Search
CPC ........................................................ G06F 3/06
See application file for complete search history.

(56) References Cited

U.S. PATENT DOCUMENTS

| | | | |
|---|---|---|---|
| 9,684,462 B2 | 6/2017 | Beaverson et al. | |
| 10,459,636 B2 | 10/2019 | Frid et al. | |
| 10,635,654 B2 | 4/2020 | Hof et al. | |
| 11,055,230 B2 | 7/2021 | Haswell | |
| 11,199,983 B2 | 12/2021 | Frid et al. | |
| 11,567,860 B2 * | 1/2023 | Kang | G06F 12/123 |
| 2021/0191855 A1 | 6/2021 | Amato | |
| 2021/0397653 A1 * | 12/2021 | Russell | G06F 21/56 |

\* cited by examiner

*Primary Examiner* — Khoa D Doan
(74) *Attorney, Agent, or Firm* — Rutan & Tucker LLP; Hani Z. Sayed; Ravi Mohan (57) ABSTRACT

Various devices, such as storage devices or systems are configured to efficiently manage and determine control table sets. Such a device may include a processor, a memory array including a plurality of memory devices which include a plurality of control table sets stored in a plurality of regions, and a control table set determination logic configured to: receive a command from a host device associated with logical to physical address mapping updates, determine a control table set of the plurality of control table sets associated with the command, determine a region of the plurality of regions associated with the determined control table set, determine a position in the control table set in the determined region associated with the command, generate additional control table sets upon a first determination that the position is not vacant, and store the command in the generated additional control table sets.

20 Claims, 7 Drawing Sheets

CONTROL TABLE SET DETERMINATION IN STORAGE DEVICES

FIELD

The present disclosure relates to storage systems. More particularly, the present disclosure relates to increasing data transfer speeds within a storage device by efficiently determining and managing control table sets comprising logical to physical mapping data.

BACKGROUND

Storage devices are ubiquitous within computing systems. Solid-state storage devices have become increasingly common. These nonvolatile storage devices can communicate and utilize various protocols including non-volatile memory express (NVMe), and peripheral component interconnect express (PCIe) to reduce processing overhead and increase efficiency.

Storage devices receive and process large numbers of requests from host-computing devices. The logical addresses requested by the host-computing device most often do not equate directly to the physical location of the data within the memory array of the storage device. Hence, most storage devices utilize logical to physical mappings, or control tables, to write and retrieve data. These mappings can be grouped together into control table sets and stored as fixed sizes of data to be accessed when required.

Data stored in storage devices, such as NAND array storage, is susceptible to read, program, and erase operations. When a data is programmed the logical address of the data has to be stored to enable reading of the data later. This logical address of any data changes with different operation and will keep updating with internal relocation trigger by the storage device for operations such as garbage collection or wear-leveling or re-writing from host. Keeping this mapping for each unit of data written requires a huge amount of space. Further, this mapping has to be retained throughout the life of the device and should not be lost with power cycle. Thus, as data is moved around, added, or deleted from the storage device, the control table sets must also be updated.

BRIEF DESCRIPTION OF DRAWINGS

The above, and other, aspects, features, and advantages of several embodiments of the present disclosure will be more apparent from the following description as presented in conjunction with the following several figures of the drawings.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

With the ever-increasing capacities of storage devices and the required random performance for the latest generation of storage devices, the number of control table data entries needs to be increased to be able to store more updates occurred as a result of spike in number of read and/or write operations. As a direct result of such a spike in read and/or write operations, performing the search operation has become increasingly time-consuming. To tackle this issue, various embodiments of the disclosure designate a specific position for each control table set and store updates to such control table set in the designated position.

Additionally, in a variety of embodiments, the control table set can be divided into regions with each region storing entries for a particular range of logical to physical address maps. Generally, data stored in storage devices, e.g., NAND array storage devices, is susceptible to frequent read, program, and erase operations. When such operations is applied to data, the logical address of the data should be stored to enable performing read operations on the data later.

Keeping the logical to physical mapping updates for each unit of data written requires a huge amount of space. Additionally, this logical to physical mapping updates has to be retained throughout the life of the device and should not be lost with power cycle. One traditional approach is to periodically flush the data from the volatile memory to the non-volatile memory, e.g., NAND memory, at certain times. However, the frequency of the flush operation is directly proportional to the write amplification of the non-volatile memory, e.g., NAND block, which is holding the logical to physical mapping updates. So there is a need for a method for managing the control table sets which minimizes the frequency of flush operation.

To avoid write amplification, the majority of the logical to physical mapping updates is kept in the volatile memory, i.e., RAM. If there is 1 mapping for each unit of data, then the logical to physical mapping update table will require a significant storage space. For example, in case of a storage device with 1 TB storage capacity, the amount of logical to physical mapping updates required for only one write operation is 32 MB. It should be noted that, a mapping of 32 MB if data is 32K which is called "mset". In a more realistic example, where there are multiple write operations in the same storage device, the amount of logical to physical mapping updates can be as high as 64 GB. Performing a search operation in such a huge logical to physical mapping updates space requires significant resources including a lot of CPU cycles. Such a search operation speed is typically is proportional to the read performance of the storage device. To address this problem, the mapping has to be arranged in such a way that search operation is performed easier and faster.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Figure 1:
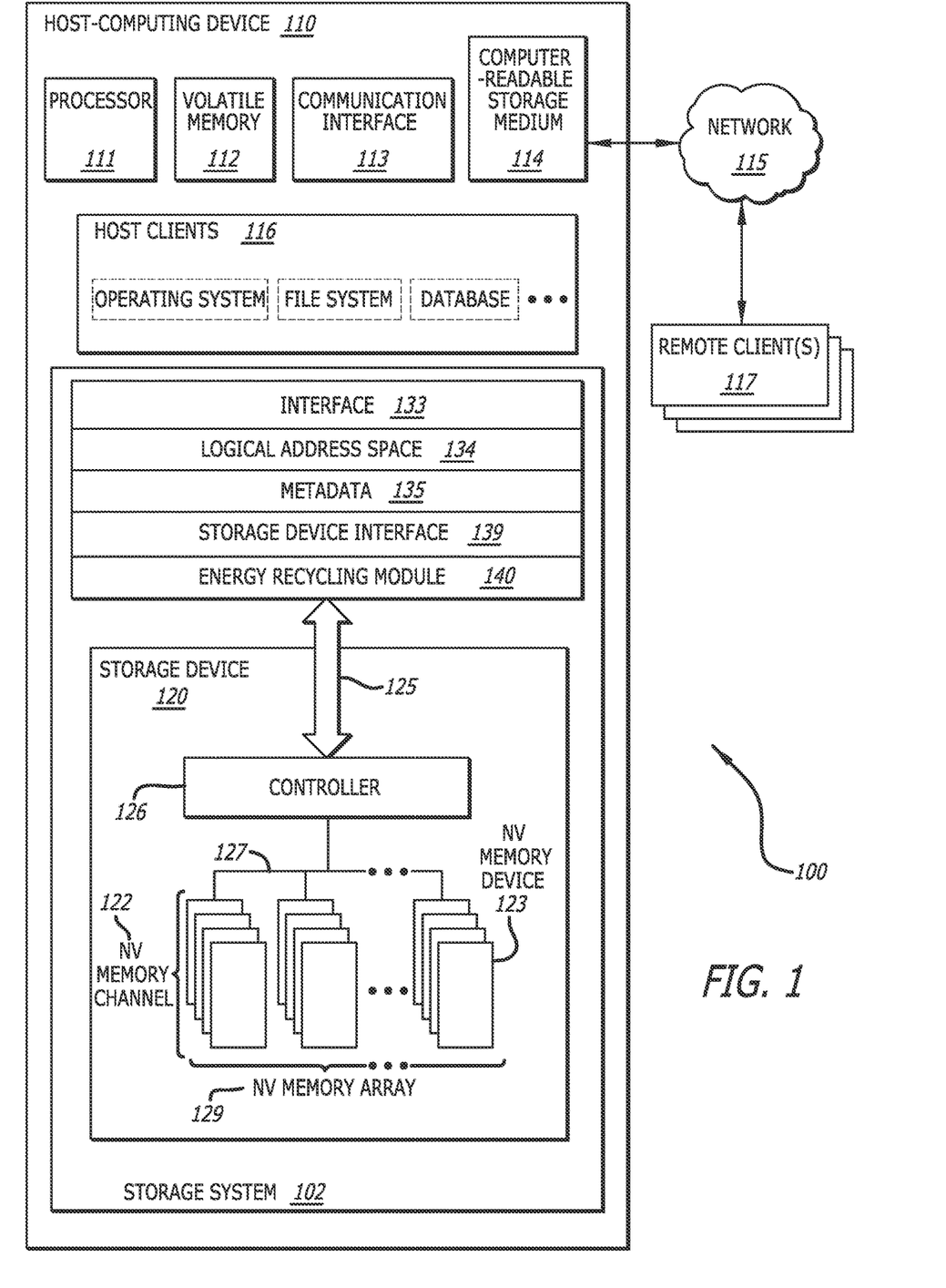
FIG. 1 is a schematic block diagram of a host-computing device with a storage system suitable for control table set determination in accordance with an embodiment of the disclosure.

Referring to FIG. 1, a schematic block diagram of a host-computing device 110 with a storage system suitable for control table set determination in accordance with an embodiment of the disclosure is shown. The control table set determination system 100 may comprise one or more storage devices 120 of a storage system 102 within a host-computing device 110 in communication via a controller 126. The host-computing device 110 may include a processor 111, volatile memory 112, and a communication interface 113. The processor 111 may include one or more central processing units, one or more general-purpose processors, one or more application-specific processors, one or more virtual processors (e.g., the host-computing device 110 may be a virtual machine operating within a host), one or more processor cores, or the like. The communication interface 113 may include one or more network interfaces configured to communicatively couple the host-computing device 110 and/or controller 126 of the storage device 120 to a communication network 115, such as an Internet Protocol (IP) network, a Storage Area Network (SAN), wireless network, wired network, or the like.

The storage device 120, in various embodiments, may be disposed in one or more different locations relative to the host-computing device 110. In one embodiment, the storage device 120 comprises one or more non-volatile memory devices 123, such as semiconductor chips or packages or other integrated circuit devices disposed on one or more printed circuit boards, storage housings, and/or other mechanical and/or electrical support structures. For example, the storage device 120 may comprise one or more direct inline memory module (DIMM) cards, one or more expansion cards and/or daughter cards, a solid-state-drive (SSD) or other hard drive device, and/or may have another memory and/or storage form factor. The storage device 120 may be integrated with and/or mounted on a motherboard of the host-computing device 110, installed in a port and/or slot of the host-computing device 110, installed on a different host-computing device 110 and/or a dedicated storage appliance on the network 115, in communication with the host-computing device 110 over an external bus (e.g., an external hard drive), or the like.

The storage device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the storage device 120 may be disposed on a peripheral bus of the host-computing device 110, such as a peripheral component interconnect express (PCI Express or PCIe) bus such, as but not limited to a NVM Express (NVMe) interface, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the storage device 120 may be disposed on a communication network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The host-computing device 110 may further comprise computer-readable storage medium 114. The computer-readable storage medium 114 may comprise executable instructions configured to cause the host-computing device 110 (e.g., processor 111) to perform steps of one or more of the methods disclosed herein. Additionally, or in the alternative, the buffering component 150 may be embodied as one or more computer-readable instructions stored on the computer-readable storage medium 114.

A device driver and/or the controller 126, in certain embodiments, may present a logical address space 134 to the host clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the storage device 120 may maintain metadata 135, such as a logical to physical address mapping structure, to map logical addresses of the logical address space 134 to media storage locations on the storage device(s) 120. A device driver may be configured to provide storage services to one or more host clients 116. The host clients 116 may include local clients operating on the host-computing device 110 and/or remote clients 117 accessible via the network 115 and/or communication interface 113. The host clients 116 may include, but are not limited to: operating systems, file systems, database applications, server applications, kernel-level processes, user-level processes, applications, and the like.

In many embodiments, the host-computing device 110 can include a plurality of virtual machines which may be instantiated or otherwise created based on user-request. As will be understood by those skilled in the art, a host-computing device 110 may create a plurality of virtual machines configured as virtual hosts which is limited only on the available computing resources and/or demand. A hypervisor can be available to create, run, and otherwise manage the plurality of virtual machines. Each virtual machine may include a plurality of virtual host clients similar to host clients 116 that may utilize the storage system 102 to store and access data.

The device driver may be further communicatively coupled to one or more storage systems 102 which may include different types and configurations of storage devices 120 including, but not limited to: solid-state storage devices, semiconductor storage devices, SAN storage resources, or the like. The one or more storage devices 120 may comprise one or more respective controllers 126 and non-volatile memory channels 122. The device driver may provide access to the one or more storage devices 120 via any compatible protocols or interface 133 such as, but not limited to, SATA and PCIe. The metadata 135 may be used to manage and/or track data operations performed through the protocols or interfaces 133. The logical address space 134 may comprise a plurality of logical addresses, each corresponding to respective media locations of the one or more storage devices 120. The device driver may maintain metadata 135 comprising any-to-any mappings between logical addresses and media locations.

A device driver may further comprise and/or be in communication with a storage device interface 139 configured to transfer data, commands, and/or queries to the one or more storage devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The storage device interface 139 may communicate with the one or more storage devices 120 using input-output control (IO-CTL) command(s), IO-CTL command extension(s), remote direct memory access, or the like.

The communication interface 113 may comprise one or more network interfaces configured to communicatively couple the host-computing device 110 and/or the controller 126 to a network 115 and/or to one or more remote clients 117 (which can act as another host). The controller 126 is part of and/or in communication with one or more storage devices 120. Although FIG. 1 depicts a single storage device 120, the disclosure is not limited in this regard and could be adapted to incorporate any number of storage devices 120.

The storage device 120 may comprise one or more non-volatile memory devices 123 of non-volatile memory channels 122, which may include but is not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more non-volatile memory devices 123 of the non-volatile memory channels 122, in certain embodiments, comprise storage class memory (SCM) (e.g., write in place memory, or the like).

While the non-volatile memory channels 122 is referred to herein as "memory media," in various embodiments, the non-volatile memory channels 122 may more generally comprise one or more non-volatile recording media capable of recording data, which may be referred to as a non-volatile memory medium, a non-volatile memory device, or the like. Further, the storage device 120, in various embodiments, may comprise a non-volatile recording device, a non-volatile memory array 129, a plurality of interconnected storage devices in an array, or the like.

The non-volatile memory channels 122 may comprise one or more non-volatile memory devices 123, which may include, but are not limited to: chips, packages, planes, die, or the like. A controller 126 may be configured to manage data operations on the non-volatile memory channels 122, and may comprise one or more processors, programmable processors (e.g., FPGAs), ASICs, micro-controllers, or the like. In some embodiments, the controller 126 is configured to store data on and/or read data from the non-volatile memory channels 122, to transfer data to/from the storage device 120, and so on.

The controller 126 may be communicatively coupled to the non-volatile memory channels 122 by way of a bus 127. The bus 127 may comprise an I/O bus for communicating data to/from the non-volatile memory devices 123. The bus 127 may further comprise a control bus for communicating addressing and other command and control information to the non-volatile memory devices 123. In some embodiments, the bus 127 may communicatively couple the non-volatile memory devices 123 to the controller 126 in parallel. This parallel access may allow the non-volatile memory devices 123 to be managed as a group, forming a non-volatile memory array 129. The non-volatile memory devices 123 may be partitioned into respective logical memory units (e.g., logical pages) and/or logical memory divisions (e.g., logical blocks). The logical memory units may be formed by logically combining physical memory units of each of the non-volatile memory devices 123.

The controller 126 may organize a block of word lines within a non-volatile memory device 123, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of a block within a non-volatile memory device 123 may be physically arranged in a monotonically increasing sequence of word line addresses, with consecutively addressed word lines also being physically adjacent (e.g., WL0, WL1, WL2, . . . WLN).

The controller 126 may comprise and/or be in communication with a device driver executing on the host-computing device 110. A device driver may provide storage services to the host clients 116 via one or more interfaces 133. A device driver may further comprise a storage device interface 139 that is configured to transfer data, commands, and/or queries to the controller 126 over a bus 125, as described above.

The storage system 102 may also include an energy recycling module 140. In various embodiments, the energy recycling module 140 may be disposed within a storage system, such as the embodiment depicted in FIG. 1. However, it is contemplated that many embodiments comprise at least one energy recycling module 140 disposed within the storage device 120 itself. As described in further detail below, the energy recycling module can be configured to capture excess heat and generate electricity that can be stored or utilized to power other components within the storage device 120 and/or storage system 102. The energy recycling module 140 may also be configured to operate in a cooling mode that can receive a power supply and cool one or more surfaces of various components within the storage device 120 or storage system 102. It should also be noted that the energy recycling module 140 may be similar to the energy recycling modules discussed throughout this disclosure such as those described in FIGS. 2-10.

Figure 2:
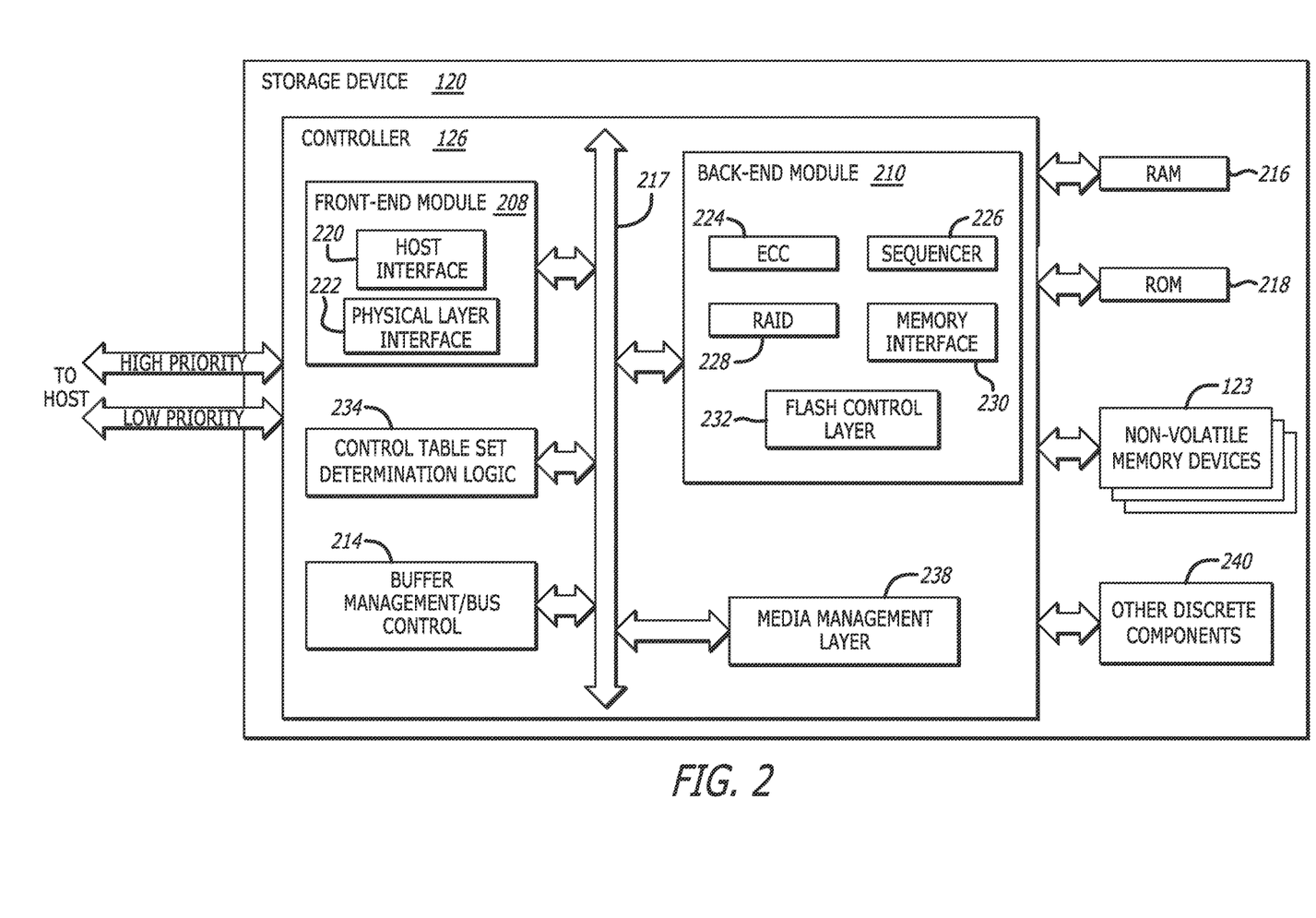
FIG. 2 is a schematic block diagram of a storage device suitable for control table set determination in accordance with an embodiment of the disclosure.

Referring to FIG. 2, a schematic block diagram of a storage device 120 suitable for control table set determination in accordance with an embodiment of the disclosure is shown. The controller 126 may include a front-end module 208 that interfaces with a host via a plurality of high priority and low priority communication channels, a back-end module 210 that interfaces with the non-volatile memory devices 123, and various other modules that perform various functions of the storage device 120. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 126 may include a buffer management/bus control module 214 that manages buffers in random access memory (RAM) 216 and controls the internal bus arbitration for communication on an internal communications bus 217 of the controller 126. A read only memory (ROM) 218 may store and/or access system boot code. Although illustrated in FIG. 2 as located separately from the controller 126, in other embodiments one or both of the RAM 216 and the ROM 218 may be located within the controller 126. In yet other embodiments, portions of RAM 216 and ROM 218 may be located both within the controller 126 and outside the controller 126. Further, in some implementations, the controller 126, the RAM 216, and the ROM 218 may be located on separate semiconductor dies. As discussed below, in one implementation, the submission queues and the completion queues may be stored in a controller memory buffer, which may be housed in RAM 216.

Additionally, the front-end module 208 may include a host interface 220 and a physical layer interface 222 that provides the electrical interface with the host or next level storage controller. The choice of the type of the host interface 220 can depend on the type of memory being used. Examples types of the host interfaces 220 may include, but are not limited to, SATA, SATA Express, SAS, Fibre Channel, USB, PCIe, and NVMe. The host interface 220 may typically facilitate transfer for data, control signals, and timing signals.

The back-end module 210 may include an error correction controller (ECC) engine 224 that encodes the data bytes received from the host and decodes and error corrects the data bytes read from the non-volatile memory devices 123. The back-end module 210 may also include a command sequencer 226 that generates command sequences, such as program, read, and erase command sequences, to be transmitted to the non-volatile memory devices 123. Additionally, the back-end module 210 may include a RAID (Redundant Array of Independent Drives) module 228 that manages generation of RAID parity and recovery of failed data. The RAID parity may be used as an additional level of integrity protection for the data being written into the storage device 120. In some cases, the RAID module 228 may be a part of the ECC engine 224. A memory interface 230 provides the command sequences to the non-volatile memory devices 123 and receives status information from the non-volatile memory devices 123. Along with the command sequences and status information, data to be programmed into and read from the non-volatile memory devices 123 may be communicated through the memory interface 230. A flash control layer 232 may control the overall operation of back-end module 210.

Additional modules of the storage device 120 illustrated in FIG. 2 may include a media management layer 238, which performs wear leveling of memory cells of the non-volatile memory devices 123. The storage device 120 may also include other discrete components 240, such as energy recycling modules, external electrical interfaces, external RAM, resistors, capacitors, or other components that may interface with controller 126. In alternative embodiments, one or more of the RAID modules 228, media management layer 238 and buffer management/bus control module 214 are optional components that may not be necessary in the controller 126.

Finally, the controller 126 may also comprise a control table set determination logic 234. In many embodiments, the control table set determination logic 234 can be configured to monitor the state of control table sets within the storage device 120. For example, the control table set determination logic 234 may configure and operate the control table cache and/or the control table change lists. The control table set determination logic 234 can direct which control table sets should be transferred into and out of the control table cache. Likewise, the control table change lists can be allocated, managed, and deleted by the control table set determination logic 234.

Figure 3:
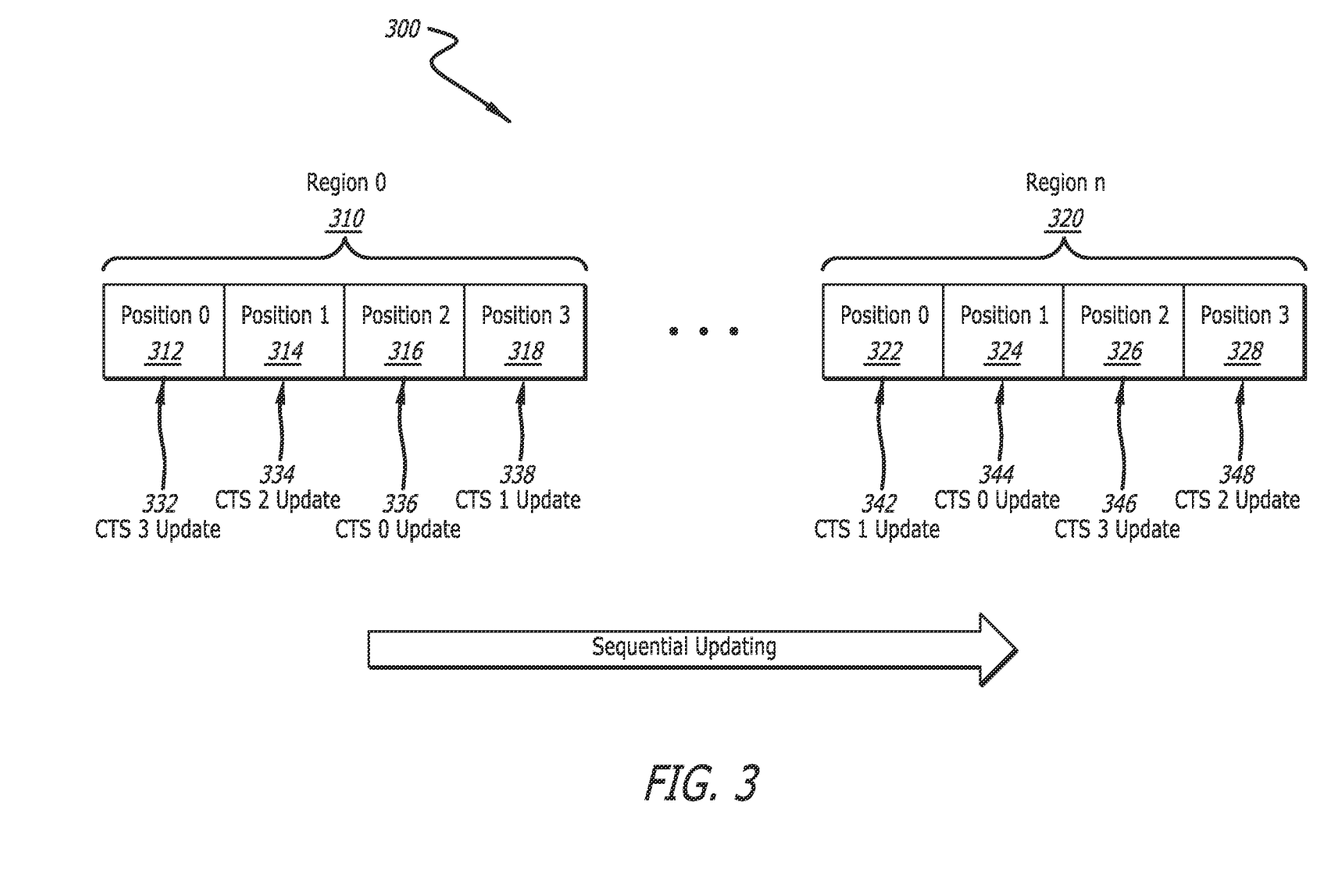
FIG. 3 is a conceptual illustration of a control table set in accordance with an embodiment of the disclosure.

Referring to FIG. 3, a conceptual illustration of a control table set 300 in accordance with an embodiment of the disclosure is shown. A control table set 300 can include a plurality of regions such as region 0 310 to region n 320. Each region can include a set of positions to store a logical to physical address mapping update associated with a certain range of entries. For example, each region of the control table set 300 is divided into 4 positions, i.e., position 0 312, position 1 314, position 2 316, and position 3 318.

Upon receiving a set of logical to physical address mapping updates (hereinafter "entry"), the control table set determination logic can sequentially store the entry to the control table set 300. That is, for each region of the control table set 300, the control table set determination logic can add the new entry to the next available position, regardless the data range of the logical to physical address mapping that is being updated by the entry. As shown, the first update is associated to a control table 3 update (shown as CTS 3 Update 332) and the control table set determination logic can store the first update in the position 0 312 of the region 0 310 of the control table set 300. Consequently, the next entry is the control table set 2 update (shown as CTS 2 Update 334) that the control table set determination logic can store in the next available position: position 1 314 of the region 0 310 of the control table set 300. Next, the third entry is the control table set 0 update (shown as CTS 0 Update 336) that the control table set determination logic can store in the next available position: position 2 316 of the region 0 310 of the control table set 300. The control table set determination logic can continue the process of updating (storing) new entries in region 0 310 of the control table set 300 until the control table set determination logic stores the last entry, i.e., control table set 1 update (shown as CTS 1 Update 338) in the last available position: position 3 318 of the region 0 310 of the control table set 300. As a non-limiting example, in case of the region n 320 of the control table set 300, the first update is the control table 1 update (shown as CTS 1 Update 342) which the control table set determination logic can store in the position 0 322 of the region n 320 of the control table set 300. Consequently, the next entry is the control table set 0 update (shown as CTS 0 Update 344) and the control table set determination logic can store it in the next available position: position 1 324 of the region n 320 of the control table set 300. Next, the third entry is the control table set 3 update (shown as CTS 3 Update 346) that the control table set determination logic can store it in the next available position: position 2 326 of the region n 320 of the control table set 300. The control table set determination logic can continue the process of updating (storing) new entries in region n 320 of the control table set 300 until the control table set determination logic stores last entry, i.e., control table set 2 update (shown as CTS 2 Update 348) in the last available position: position 3 328 of the region n 320 of the control table set 300.

In some embodiments, the control table set determination logic can utilize a mapping (hereinafter "hashing") function to combine different control table sets into one group. For example the hashing function can generate a first group of control table set updates including control update set 0, control update set 1, control update set 2, control update set 3, control update set 4 and control update set 5 and assign them to the first region, i.e., region 0 310. Similarly, the hashing function can generate a second group of control table set updates including control update set 6, control update set 7, control update set 8, control update set 9, control update set 10 and control update set 11 and assign them to the second region (not shown). The hashing function can continue until it generates a last group of control table set updates including control update set n−5, control update set n−4, control update set n−3, control update set n−2, control update set n−1 and control update set n and assign them to the last region, i.e., region n 320. By doing such a grouping, the control table set determination logic can contain any control table set updates in each group in a specific region. As a result, the control table set determination logic can also contain performing the search operation for a write command on a particular logical location in a single. pre-designated region. For example, if the control table set determination logic receives a write command on control table set 5, the control table set determination logic will go to region 0 310 and perform the write command. Similarly, a read operation can follow the same pattern. In some embodiments, control table set determination logic can determine the size of each region dynamically. As a result, a single region can have multiple updates.

In some embodiments, in order to update in a specific region, control table set determination logic can combine the write commands into a write unit. Further, control table set determination logic can create an item to store certain amount of write units. The control table set determination logic can update the write units sequentially one after the other and once a read command is received, perform the search operation in the specific region. In an embodiment, if a region is updated several times due to write commands or relocation commands, there may be numerous write units, which can lead to an increase in the time required to perform the search operation and thus, a reduction in the overall performance of the storage device. However, limiting the number of write units can require repeated copying back the data to the non-volatile memory, which will again increase the write amplification of the non-volatile memory block that holds the logical to physical address mapping updates.

In some embodiments, in order to reduce the time required to perform the search operation, the control table set determination logic can use a hashing function to determine a fixed position for each entry. That is, each entry can be assigned to a specific, fixed position in a region. During a write operation, if the control table set determination logic determines that the position is full, a new set of additional control table sets will be created for storing new entries. The size of each region can be managed, though. In other words, the number of times that each region can be allocated additional set of control table sets cannot exceed a pre-determined number. For example, in an embodiment, each region can include only one additional set of control table sets before the flushing operation is performed. Thus, if the control table set determination logic determines that the region already includes an additional set of control table sets, the control table set determination logic can perform a flush operation and write the new data to the non-volatile memory. Fixed-position updating process is described in more detail below.

Figure 4:
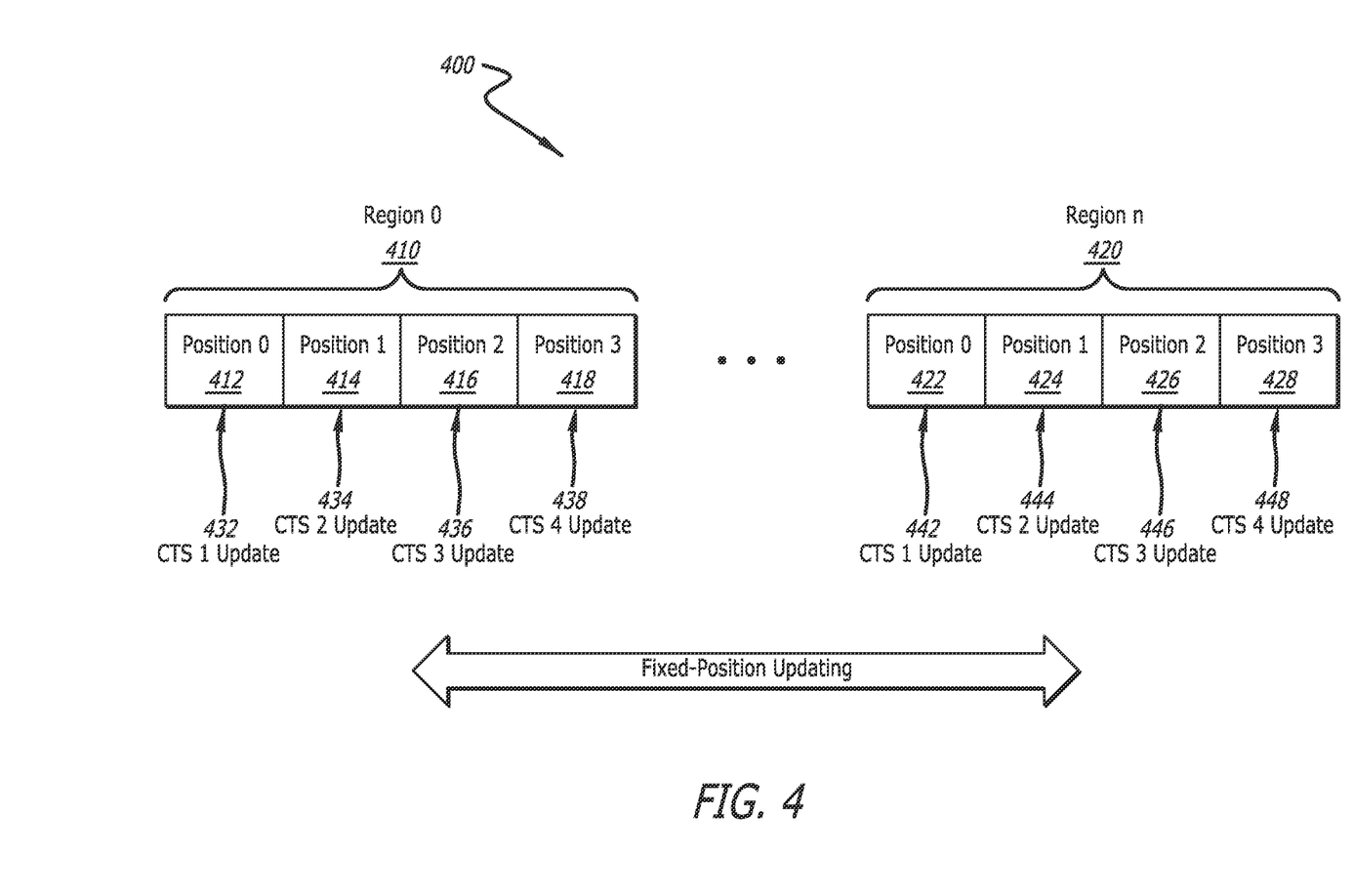
FIG. 4 a conceptual illustration of updating a control table set utilizing a fixed-position method in accordance with an embodiment of the disclosure.

Referring to FIG. 4, a conceptual illustration of updating a control table set 400 utilizing a fixed-position method in accordance with an embodiment of the disclosure is shown. In various embodiments, each of the plurality of control table sets can be associated with a fixed position that is pre-assigned to the corresponding control table set. Further, each of the plurality of control table sets can store a distinct range of logical to physical address mapping data entries. In some embodiments, the control table set 400 can include a plurality of regions such as region 0 410 to region n 420. Each region can include a set of positions to store a logical to physical address mapping update associated with a certain range of entries. For example, each region of the control table set 400 is divided into 4 positions, i.e., position 0 412, position 1 414, position 2 416, and position 3 418.

Upon receiving a new set of logical to physical address mapping updates ("entry"), the control table set determination logic can store the entry to the control table set 400. However, the control table set determination logic can store each new entry to a pre-determined fixed position in a specific region. To that end, the control table set determination logic can utilize the hashing function to determine the pre-determined position of each new entry.

As shown, the control table set determination logic can only store the update associated to the control table 1 (shown as CTS 1 Update 432) in the position 0 412 of the region 0 410 of the control table set 400. Similarly, the control table set determination logic can only store the update associated to the control table 2 (shown as CTS 2 Update 434) in the position 1 414 of the region 0 410 of the control table set 400. Further, the control table set determination logic can only store the update associated to the control table 3 (shown as CTS 3 Update 436) in the position 2 416 of the region 0 410 of the control table set 400. Additionally, the control table set determination logic can only store the update associated to the last control table, i.e., control table set 4 (shown as CTS 4 Update 438) in the position 3 418 of the region 0 410 of the control table set 400.

Further, the control table set determination logic can only store the update associated to the control table 1 (shown as CTS 1 Update 442) in the position 0 422 of the region n 420 of the control table set 400. Similarly, the control table set determination logic can only store the update associated to the control table 2 (shown as CTS 2 Update 444) in the position 1 424 of the region n 420 of the control table set 400. Further, the control table set determination logic can only store the update associated to the control table 3 (shown as CTS 3 Update 446) in the position 2 426 of the region n 420 of the control table set 400. Additionally, the control table set determination logic can only store the update associated to the last control table, i.e., control table set 4 (shown as CTS 4 Update 448) in the position 3 428 of the region n 420 of the control table set 400.

Thus, if the control table set determination logic receives the CTS 3 Update 436 first and then receives CTS 1 Update 432, the control table set logic stores the CTS 3 Update 436 in the position 2 416 of the region 0 410 of the control table set 400, and then stores the CTS 1 Update 432 in the position 0 412 of the region 0 410 of the control table set 400. Similarly, if the control table set determination logic receives the CTS 4 Update 448 first and then receives CTS 2 Update 444, the control table set logic stores the CTS 4 Update 448 in the position 3 428 of the region n 420 of the control table set 400, and then stores the CTS 2 Update 444 in the position 1 424 of the region n 420 of the control table set 400.

Figure 5:
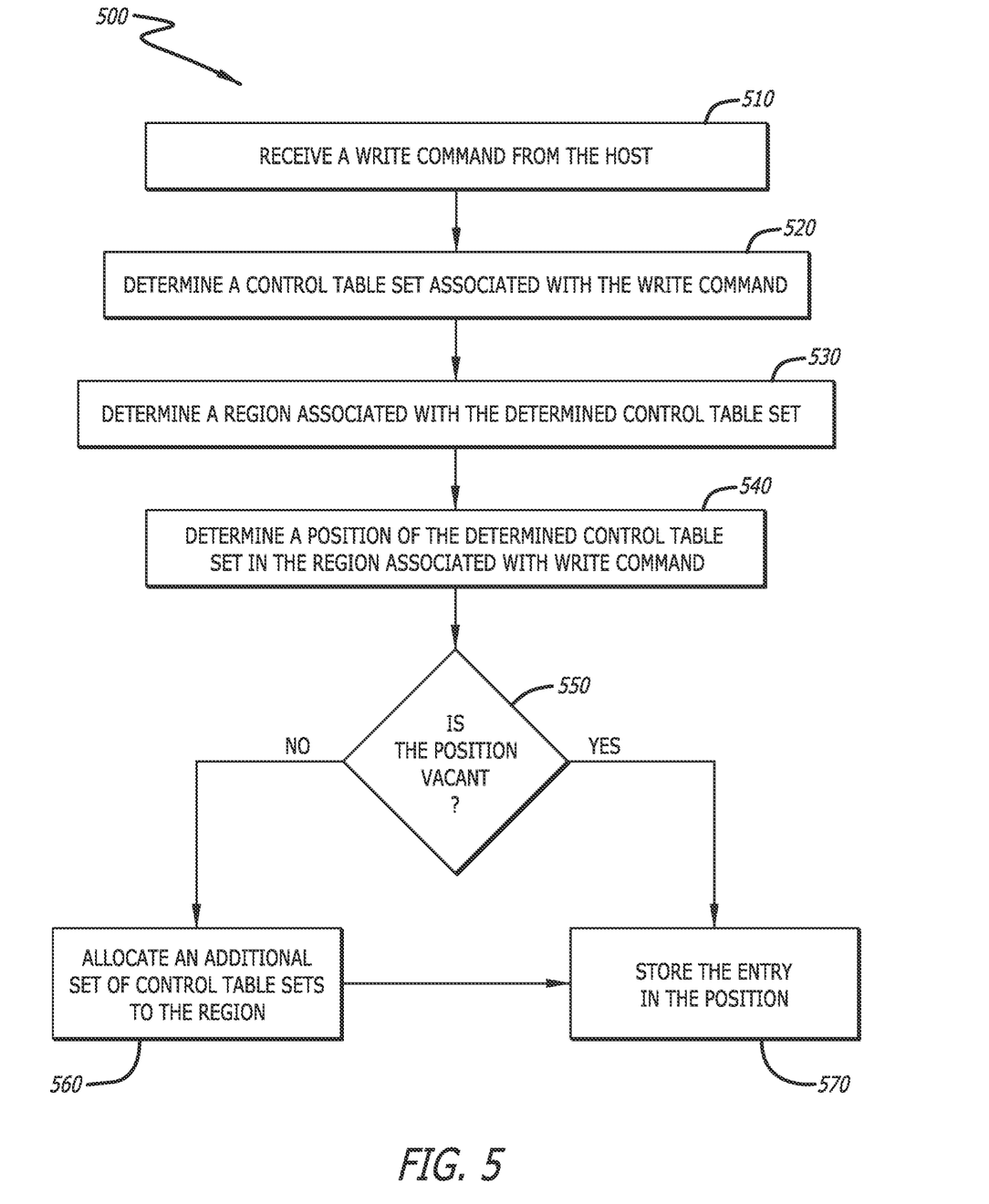
FIG. 5 is a flowchart depicting a process for determining a fixed position for an entry in a control table set in accordance with an embodiment of the disclosure.

FIG. 5 a flowchart depicting a process 500 for determining a fixed position for an entry in a control table set in accordance with an embodiment of the disclosure is shown. In many embodiments, the process 500 can start at block 510 where the process 500 receives a command from a host device. The received command can be write command or a relocation command. The received command can be associated with logical to physical address mapping updates. In an embodiment, the process 500 can determine a control table set of a plurality of control table sets which is associated with the received command, as shown in block 520. The process 500 can utilize a mapping (hashing) function to determine the control table set associated with the received command.

In some embodiments, the process 500 can determine a region of a plurality of regions which is associated with the determined control table set, as shown by block 530. The process 500 can utilize the mapping function to determine the region associated with the control table set. In various embodiments, the process 500 can then determine a position in the region that is associated with the received command, as shown by block 540. The position can be a pre-determined fixed position which can only store a certain entry. The process 500 can utilize the mapping function to determine the position in the region associated with the received command. In additional embodiments, the process 500 can determine whether the position is full or is vacant, as shown by block 550. Upon a determination that the position is not vacant, i.e., is full, then the process 500 can generate and allocate a pre-defined number of additional control table sets in the region, as shown by block 560. Alternatively, if the position is vacant, the process 500 can store the entry in the vacant position, as shown by block 570. The process 500 can further store the new entry in the generated additional set of control table sets.

Figure 6:
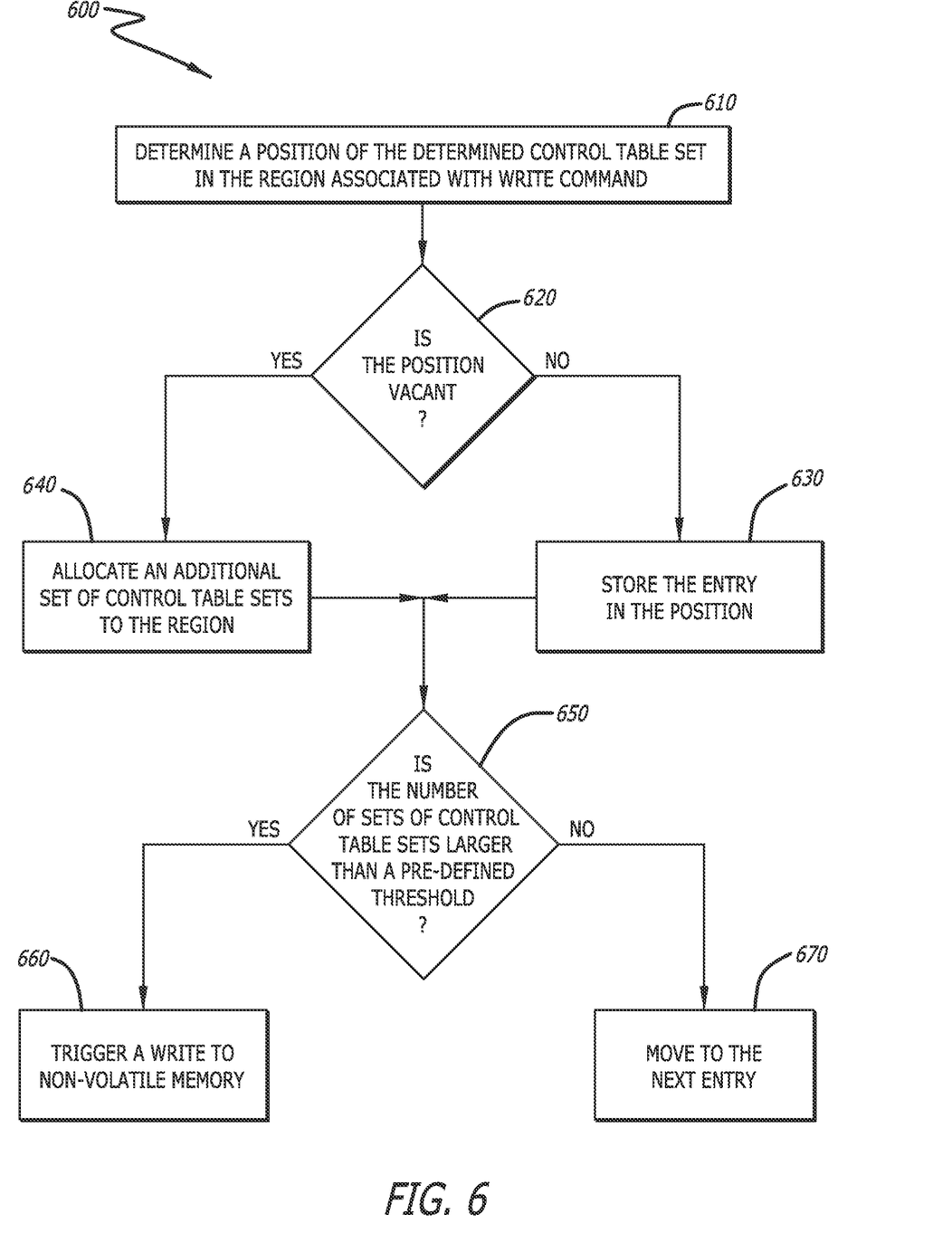
FIG. 6 is a flowchart depicting a process for determining control table sets using a mapping function in accordance with an embodiment of the disclosure.

Referring to FIG. 6, a flowchart depicting a process 600 for determining control table sets using a mapping function in accordance with an embodiment of the disclosure is shown. The process 600 can begin at block 610 where the process 600 can determine a position of the determined control table set in the region associated with the write command. As noted above, the position can be a pre-determined fixed position which can only store a certain entry. In some embodiments, the process 600 can apply a mapping function, e.g., a hashing function, to the entry to map each entry to the particular position associated with the entry. The mapping function can be a mathematical function.

In some embodiments, the process 600 can determine whether the position is full or is vacant, as shown by block 620. If the position is vacant, the process 600 can store the entry in the vacant position, as shown by block 630. Alternatively upon a determination that the position is not vacant then the process 600 can generate a pre-defined number of additional control table sets in the region, as shown by block 640. In an embodiment, the process 600 can then determine whether a number of times that additional control table sets are generated in the region exceeds a predefined threshold, as shown by block 650. If the number of times that additional control table sets are generated in the region exceeds the predefined threshold, then the process 600 can trigger a write operation from each of the control table sets to a non-volatile memory, as shown by block 660. Otherwise, if the number of times that additional control table sets are generated in the region does not exceed the predefined threshold, then the process 600 can move to the next entry, as shown by block 670. In some embodiments, the predefined threshold is 1. That is, only one set of additional control table sets can be added to each region, if required. Thus, once the process 600 determines that the region already includes additional control table sets, then the process 600 triggers the write operation into the non-volatile memory. This way, the process 600 ensures that while the size of each region can be dynamically increased, such a dynamic increase has an upper limit, beyond which, the process 600 writes into the non-volatile memory instead of the volatile memory. In some embodiments, the non-volatile memory is a NAND array memory device.

Figure 7:
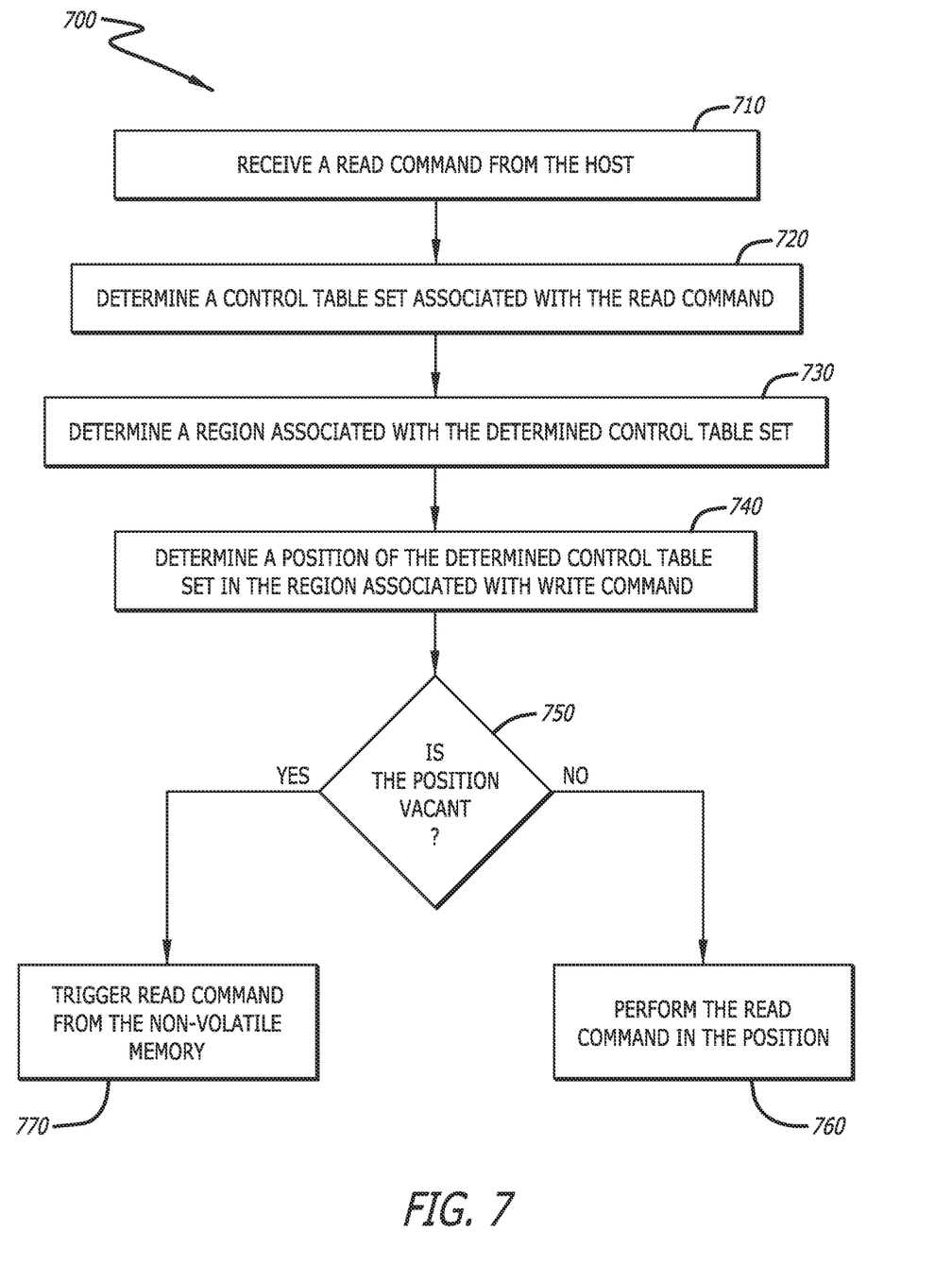
FIG. 7 is a flowchart depicting a process for performing a read operation in a plurality of control table sets in accordance with an embodiment of the disclosure.

FIG. 7 a flowchart depicting a process 700 for performing a read operation in a plurality of control table sets in accordance with an embodiment of the disclosure is shown. In many embodiments, the process 700 can start at block 710 where the process 700 can receive a read command from the host device. The read command can be associated with logical to physical address mapping updates. In an embodiment, the process 700 can determine a control table set of a plurality of control table sets which is associated with the read command, as shown in block 720. The process 700 can utilize a mapping (hashing) function to determine the control table set associated with the read command.

In some embodiments, the process 700 can determine a region of a plurality of regions which is associated with the determined control table set, as shown by block 730. The process 700 can utilize the mapping function to determine the region associated with the control table set. In various embodiments, the process 700 can then determine a position in the region that is associated with the read command, as shown by block 740. The position can be a pre-determined fixed position which can only store a certain entry. The process 700 can utilize the mapping function to determine the position in the region associated with the read command. In additional embodiments, the process 700 can determine whether the position is full or is vacant, as shown by block 750. Upon a determination that the position is not vacant, i.e., is full, then the process 700 can perform the requested read operation from the position, as shown by block 760. Alternatively, if the position is vacant, the process 700 can trigger the read operation from the non-volatile memory, as shown by block 770.

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, including:
a processor;
a memory array comprising a plurality of memory devices, wherein the plurality of memory devices include a plurality of control table sets stored in a plurality of regions; and
a control table set determination logic configured to:
receive a command from a host device, wherein the received command is associated with logical to physical address mapping updates, wherein the received command is at least one of a write command and a relocation command;
determine a control table set of the plurality of control table sets associated with the received command;
determine a region of the plurality of regions associated with the determined control table set;
determine a position in the control table set in the determined region associated with the received command;
upon a first determination that the position is not vacant, generate a predefined number of additional control table sets in the region; and
store the received command in the generated additional control table sets.

2. The device of claim 1, wherein the position is a fixed position.

3. The device of claim 1, wherein the control table set determination logic is configured to:
upon a second determination that the position is vacant, store the received command in the position.

4. The device of claim 1, wherein the control table set determination logic is configured to apply a mapping function to determine at least one of: the control table set of the plurality of control table sets associated with the received command, the region of the plurality of regions associated with the determined control table set, and the position in the control table set in the determined region associated with the received command.

5. The device of claim 1, wherein the control table set determination logic is configured to:
upon a third determination that a number of times that additional control table sets are generated in the region exceeds a predefined threshold, trigger a write operation from each of the control table sets to a non-volatile memory.

6. The device of claim 5, wherein the predefined threshold is 1.

7. The device of claim 5, wherein the non-volatile memory is a NAND.

8. The device of claim 1, wherein each of the plurality of control table sets is configured to store logical to physical mapping data entries.

9. The device of claim 1, wherein each of the plurality of control table sets is associated with a fixed position that is pre-assigned to the corresponding control table set.

10. The device of claim 1, wherein each of the plurality of control table sets is configured to store a distinct range of logical to physical address mapping data entries.

11. The device of claim 1, wherein the control table set determination logic is configured to:
in response to receiving a read command from the host device, determine whether a corresponding position is vacant; and
upon a fourth determination that the corresponding position is not vacant, perform a read operation from the corresponding position.

12. The device of claim 11, wherein the control table set determination logic is configured to:
upon a fifth determination that the position is vacant, perform the read operation from a non-volatile memory associated with the device.

13. The device of claim 12, wherein the non-volatile memory is a NAND.

14. A method for managing control table sets, the method comprising:
receiving a command from a host device, wherein the received command is associated with logical to physical address mapping updates, and wherein the received command is at least one of a write command and a relocation command;
determining a control table set associated with the received command;
determining a region in a storage device, wherein the region is associated with the determined control table set;
determining a fixed position in the control table set in the determined region associated with the received command; and upon a first determination that the fixed position is vacant, storing the received command in the fixed position.

15. The method of claim 14, further comprising:
upon a second determination that the fixed position is not vacant, generating a predefined number of additional control table sets in the region; and
storing the received command in the generated additional control table sets.

16. The method of claim 14, further comprising:
upon a third determination that the predefined number of control table sets are previously generated for the region, triggering a write operation from each of the control table sets to a non-volatile memory.

17. The method of claim 14, wherein at least one of the determining the control table set associated with the write command, the determining the region in the storage device, and the determining the fixed position is performed by applying a mapping function to the received command.

18. The method of claim 14, wherein each of the plurality of control table sets is configured to store a distinct range of logical to physical mapping data updates.

19. The method of claim 14, wherein each of the control table sets is configured to store a distinct range of logical to physical address mapping updates.

20. A non-transitory machine-readable medium having instructions stored therein, which when executed by a processor, direct the processor to perform operations comprising:
receiving a command from a host device, wherein the received command is associated with logical to physical address mapping updates, and wherein the received command is at least one of a write command and a relocation command;
determining a control table set associated with the received command;
determining a region in a storage device, wherein the region is associated with the determined control table set;
determining a fixed position in the control table set in the determined region associated with the received command;
upon a first determination that the fixed position is not vacant, generating a predefined number of control table sets in the region;
storing the received command in the generated control table sets; and
upon a second determination that the fixed position is vacant, storing the received command in the fixed position.

\* \* \* \* \*